United States Patent Office 3,562,150
Patented Feb. 9, 1971

3,562,150
REMOVAL OF METAL CONTAMINANTS FROM CATALYSTS WITH HYDROGEN PEROXIDE
Harry A. Hamilton, Natrona Heights, Howard G. McIlvried, Pittsburgh, and Raynor T. Sebulsky, Verona, Pa., assignors to Gulf Research & Development Company, Pittsburgh, Pa., a corporation of Delaware
No Drawing. Filed June 16, 1967, Ser. No. 651,343
Int. Cl. C10g 23/02; B01j 11/02, 11/68
U.S. Cl. 208—216                                    8 Claims

ABSTRACT OF THE DISCLOSURE

Removal of metal contaminants, such as nickel and vanadium, from a catalyst is effected by treatment of the catalyst with hydrogen peroxide in the liquid state.

Our invention relates to the removal of metal contaminants from a catalyst by treatment wih hydrogen peroxide. More particularly our invention relates to a process for regenerating a catalyst whose activity has become diminished through contamination with metals, by removing such metal contaminants through contacting the catalyst with hydrogen peroxide and then subjecting the catalyst to an oxidative burn-off. Our invention is also applicable to the conduct of a hydrocarbon treatment process wherein the catalyst becomes deactivated through contamination by metals contained in the charge stock and the catalyst is then regenerated by removing contaminant metals therefrom through contacting with hydrogen peroxide after which the catalyst is subjected to an oxidative burn-off and is then re-employed in the hydrocarbon treatment operation.

During the course of treating hydrocarbons at high temperatures in accordance with many well known processes, including, for example, hydrodesulfurization and catalytic cracking, the catalysts usually become deactivated or diminished in activity. It is well known that many hydrocarbon stocks, especially residual stocks, contain metal contaminants, particularly metal-organic compounds of vanadium and nickel, and this deactivation or diminution of activity is particularly pronounced when treating such hydrocarbon stocks. The activity loss when processing such stocks is due in part at least, to the deposition of metal contaminants on the catalyst. While the art has long taught that coke can be removed from the deactivated catalyst by employment of an oxidative burn-off technique, usually comprising nothing more than contacting the coked catalyst with an oxygen-containing gas at an elevated temperature, such technique is substantially ineffective in the removal of metal contaminants from the catalyst, and consequently will fail to restore the catalyst to high activity and those cases where deposits of such metallic contaminants contribute to loss of activity. Furthermore, the effect of the deposition of such metallic contaminants will be cumulative, so that through repeated use of such a catalyst by a series of alternating on-stream cycles and oxidative burn-offs, the quantity of metallic contaminants present on the catalyst will constantly increase and thereby reach a point where further regeneration by coke removal alone will fail to provide a regenerated catalyst suitable for commercial employment.

We have discovered a process whereby metal contaminants can be removed quite readily and effectively from catalysts containing such undesired metals. In accordance with our process a catalyst, for example, a hydrocarbon processing catalyst, which contains metal contaminants is contacted with hydrogen peroxide in the liquid state and then the catalyst is separated from the hydrogen peroxide. This technique, we have found, is effective to remove substantial quantities of metal contaminants from the treated catalyst. Accordingly, our invention provides a process for regenerating a catalyst whose activity has become diminished by employment in the high temperature treatment of a metal containing hydrocarbon. Our regenerating process comprises generally contacting such a catalyst of diminished activity with hydrogen peroxide in the liquid state, separating the contacted catalyst from the hydrogen peroxide and/or the reaction products of the hydrogen peroxide and then drying the catalyst. The dried catalyst is then subjected to an oxidative burn-off to remove coke from the catalyst. It must be pointed out here that it is essential to the operation of our invention that the catalyst be treated with hydrogen peroxide prior to being subjected to an oxidative burn-off in order to obtain the advantageous results provided by our invention. Any attempt to burn the coke from the catalyst prior to a hydrogen peroxide treatment for metals removal, we have found, usually produces a catalyst which is not greatly improved over the deactivated catalyst and at times does not achieve the activity level of a catalyst which has been subjected only to the prior art oxidative burn-off.

Accordingly, our invention provides an improved method for the treatment of hydrocarbons, which method comprises contacting a metals-containing hydrocarbon stock with a catalyst under hydrocarbon processing conditions and continuing such contacting until the catalyst has become substantially deactivated, due at least in part to metals contamination. Contacting of the catalyst with the hydrocarbon is then discontinued and the deactivated catalyst is contacted with hydrogen peroxide in the liquid state. Thereafter the catalyst is separated from the hydrogen peroxide and/or its reaction products and dried. The dried catalyst is then subjected to an oxidative burn-off, after which the regenerated catalyst is again contacted with the hydrocarbon feed stock under desired operating conditions. The hydrocarbon treatment processes to which the method of our invention is applicable include both fluidized and fixed bed operations, processes conducted in either the absence or presence of substantial quantities of added hydrogen and processes employing both single functional catalysts as well as dual functional catalysts, e.g. hydrogen treating catalysts comprising both a hydrogenating component and a cracking component. The dual functional catalyst is comprised of a metalliferous hydrogenating component composited with a carrier. The metalliferous hydrogenating component is selected from the group consisting of Group VI and Group VIII metals, their oxides and sulfides, and the carrier consists essentially of a member of the group consisting of refractory metal oxides.

The hydrogen peroxide employed in accordance with our invention need not be 100 percent pure hydrogen peroxide but can be an aqueous solution of hydrogen peroxide. In fact, we usually prefer to employ an aqueous solution of hydrogen peroxide. Such an aqueous solution of hydrogen peroxide can contain between about 0.1 and 50 percent by weight hydrogen peroxide. Furthermore, we have discovered that in many instances it is advantageous to employ an aqueous solution of hydrogen peroxide containing less than about 10 percent by weight hydrogen peroxide and at times even less than about 1 percent by weight hydrogen peroxide. The advantage of employing dilute solutions, it is believed, is due in part to the lowered tendency of such solutions to decompose spontaneously with consequent loss of oxidative capacity.

Although the contacting of catalyst and hydrogen peroxide can be conducted as either a batch type operation or a continuous flow operation, for best results the actual quantity of hydrogen peroxide in the aqueous hydrogen peroxide solution contacting the catalyst should be at least about 4.5 grams of hydrogen peroxide per gram of contaminating vanadium and about 2 grams of hydrogen peroxide solution contacting the catalyst should be at upon the concentration of the peroxide treating solution and the level of contaminating metals in the catalyst, this can range from about 0.5:1 up to about 50:1 volumes of hydrogen peroxide solution per volume of catalyst. The contacting time between the hydrogen peroxide and the catalyst will usually vary anywhere from 15 minutes up to about 160 hours, although longer or shorter times can be employed. While maintaining contact between the catalyst and the hydrogen peroxide in excess of 160 hours is not detrimental, any increase in total metals removed from the catalyst due to increased contacting time becomes marginal.

While contacting a contaminated catalyst with a small amount of hydrogen peroxide is effective to remove appreciable quantities of metal contaminants from the catalyst, it is usually desirable to remove as much of the contaminants as possible. In some instances the removal of smaller quantities of contaminants, such as, for example, about 25 or 30 percent, may not be sufficient to provide a treated catalyst of greatly enhanced activity. Usually, however, removal of about 40 to 50 percent or more of the contaminant metals, particularly vanadium, is sufficient to provide a treated catalyst of significantly enhanced activity.

As a general rule the quantity of hydrogen peroxide employed in our process should be sufficient to react with at least a substantial portion, if not all, of the metallic contaminants on the catalyst. This can be accomplished by proper selection of the appropriate concentration and the total volume of hydrogen peroxide solution employed.

While not wanting to be limited to any particular theory of operation, we believe that our process operates generally as follows. Analyses of the vanadium, nickel and sulfur contents of contaminated catalysts have led us to believe that much of the vanadium is present as vanadium trisulfide, $V_2S_3$, and much of the nickel is present as nickel sulfide, NiS. It is believed then, that the removal of metals from contaminated catalyst is accomplished generally in accordance with the following reactions:

(1) 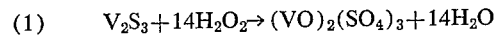

or (2) 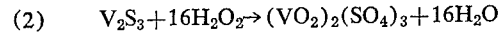

and (3) 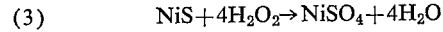

These reactions would explain why the hydrogen peroxide treatment must precede the oxidative burn-off in order to have an effective process. The oxidative burn-off removes sulfur by converting the sulfides to oxides, and if sulfur is not present, soluble sulfates cannot be formed.

In many instances we have found it to be advantageous to employ some type of solvent for removing oil from the catalyst prior to the hydrogen peroxide treatment. Any of the well known hydrocarbon solvents can be employed for this purpose and include materials such as benzene and naphtha.

We have also found that at times it may be advantageous to subject the hydrogen peroxide contacted catalyst to washing with an inert medium such as, for example, water. Such washing is usually effective to remove an increased quantity of metal contaminants from the catalyst and can most advantageously be employed prior to drying the catalyst and the oxidative burn-off step.

The hydrocarbon processes for the treatment of metals-containing charge stocks to which the method of our invention is applicable generally employ temperatures from about 400° to about 1000° F. and pressures from about 500 to about 6000 p.s.i.g. In fluid catalytic processes, such as fluid catalytic cracking, a catalyst to oil ratio from about 3:1 to about 20:1 and a weight hourly space velocity from about 1 to about 20 are usually employed. When conducting hydrogen treating processes the hydrogen feed rate is generally from about 500 to about 5000 s.c.f. of hydrogen per barrel of feed stock and the liquid hourly space velocity varies from about 0.1 to about 10. We have found that the method of our invention is particularly applicable to the process of catalytic hydrodesulfurization.

In order to illustrate our invention in greater detail, reference is made to the following examples.

EXAMPLE I

In this example a catalyst which in the fresh state comprised about 0.6 percent by weight nickel, about 1.1 percent by weight cobalt and about 8.9 percent by weight molybdenum on an alumina carrier was first employed in a 110 day desulfurization run charging West Texas reduced crude containing 36 p.p.m. vanadium and 23 p.p.m. nickel. The operating conditions of this run included a temperature from 750° to 811° F., a pressure of 2650 p.s.i.g., a liquid hourly space velocity of 0.7 and a hydrogen feed rate of 5000 s.c.f. of hydrogen per barrel of reduced crude. The catalyst from this 110 day run was then divided into four portions each of which was given a different treatment as described below.

Portion 1 was given no additional treatment.

Portion 2 was regenerated by subjection to an oxidative burn-off at 950° F. for about 6 hours.

Portion 3 was treated with a 30 percent by weight aqueous solution of hydrogen peroxide flowing at a rate of 200 ml. of peroxide solution per gram of catalyst for one hour at a temperature of 160° F. The hydrogen peroxide contacted catalyst was then dried for about two hours at a temperature of 300° F., after which it was subjected to the same type oxidative burn-off at 950° F. used for Portion 2.

Portion 4 was first subjected to an oxidative burn-off at a temperature of 950° F. after which it was contacted with a 30 percent by weight aqueous solution of hydrogen peroxide flowing at a rate of 200 ml. of hydrogen peroxide solution per gram of catalyst at a temperature of 160° F. for one hour. This peroxide contacted catalyst was then dried for about two hours at a temperature of 300° F. and then heated to a temperature of 950° F. for about 16 hours.

Each of the four portions of catalyst was analyzed for metals contaminants and then tested for desulfurization activity employing a feed blend of 80 percent by volume Kuwait atmospheric light gas oil and 20 percent by volume xylene. This blend contained 1.95 percent by weight sulfur. The conditions employed for the desulfurization test included a temperature of 650° F., a pressure of 600 p.s.i.g., a liquid hourly space velocity of 1 and a hydrogen feed rate of 4000 s.c.f. per barrel. The desulfurization activity for each of these portions of catalyst together with the metals content thereof are set forth below in Table I. For purposes of comparison a sample of the fresh nickel-cobalt-molybdenum catalyst was also tested for desulfurization activity under the same conditions.

oxide solution for a period of 16 hours. This hydrogen peroxide contacted material was not subjected to any wa-

TABLE I

| Catalyst treatment | Catalyst activity, percent desulfurization | Vanadium content, percent by wt. | Vanadium removal, percent | Nickel [1] Content, percent by wt. | Removal, percent |
|---|---|---|---|---|---|
| Fresh catalyst | 52.8 | | | | |
| Aged catalyst | 32.8 | 8.9 | 0 | 2.8 | 0 |
| Aged catalyst, oxidative burn-off only | 43.1 | 10.8 | 0 | 4.1 | 0 |
| Aged catalyst, $H_2O_2$ Treatment followed by oxidative burn-off | 50.3 | 4.9 | 55 | 2.1 | 49 |
| Aged catalyst, oxidative burn-off before the $H_2O_2$ treatment | 33.3 | 9.5 | 12 | 3.0 | 27 |

[1] Over and above that on fresh catalyst.

From the data in Table I it can be seen that the aged catalyst prior to any regeneration attempt possessed a substantially diminished desulfurization activity as well as a comparatively high content of nickel and vanadium metal contaminants. It will also be noticed that the aged catalyst which had been subjected only to the oxidative burn-off treatment showed a somewhat increased desulfurization activity but that such desulfurization activity did not approach the original activity of the fresh catalyst. (The increased percentage of vanadium and nickel shown for this catalyst does not represent an increase in quantity of contaminant metals on the catalyst but rather represents the percentage by weight of such metals based upon the total weight of the catalyst which had been substantially reduced by coke removal.) The catalyst which had been treated in accordance with the process of our invention, however, showed a desulfurization activity quite comparable to that possessed by the fresh catalyst. Furthermore, it will be noted that the quantities of both vanadium and nickel present on the catalyst treated in accordance with our invention were substantially reduced from that of the aged catalyst representing a 55 percent vanadium removal and a 49 percent nickel removal. Most interesting of all, however, is the fact that the portion of the aged catalyst which had first been subjected to an oxidative burn-off followed by peroxide treatment provided a catalyst having a desulfurization activity not significantly different from that possessed by the aged catalyst without the benefit of any regeneration treatment whatsoever. Thus, although oxidative burn-off followed by peroxide treatment is effective to remove at least some of the vanadium and nickel contaminants from the catalyst, this particular sequence of operative steps does not appear to provide any advantage whatsoever regarding catalyst reactivation and in fact appears to be inferior to the results obtained by oxidative burn-off alone.

EXAMPLE II

In this example another dual functional catalyst which had been contaminated with metals through high temperature treatment of a metals containing hydrocarbon stock showed a vanadium content of 8.5 percent by weight. A 10 gram sample of this catalyst was treated with 400 ml. of a 3 percent aqueous hydrogen peroxide solution for 24 hours and then subjected to vanadium analysis. The hydrogen peroxide contacted catalyst was next washed with 100 ml. of water for a period of one hour and again subjected to vanadium analysis. These analyses indicated that after treatment with hydrogen peroxide 80 percent by weight of the vanadium had been removed from the catalyst and that after the water washing step 82 percent by weight of the vanadium had been removed from the catalyst.

EXAMPLE III

In this example 25 grams of a contaminated catalyst, which in its fresh state comprised 0.6 percent by weight nickel, 1.1 percent by weight cobalt and 8.9 percent by weight molybdenum and in its contaminated state contained 7.7 percent by weight vanadium and 2.6 percent by weight nickel (on a coke free basis) was treated with 100 ml. of a 0.75 percent by weight aqueous hydrogen per- ter washing but after decanting was immediately dried by treating it at a temperature from 250° to 350° F. for several hours after which the catalyst was subjected to an oxidative burn-off at a temperature of 950° F. for a period of about 16 hours. Analysis of this catalyst showed it to have a nickel content of 0.8 percent by weight, a cobalt content of 0.9 percent by weight, a molybdenum content of 6.2 percent by weight and a vanadium content of 2.0 percent by weight. Furthermore, this analysis indicated that 74 percent of the vanadium present on the contaminated catalyst was removed while 90 percent of the contaminating nickel on the catalyst, that is nickel over and above that initially present on the fresh catalyst, was removed. From these data it will be seen that the process of our invention is effective to remove substantial quantities of metal contaminants, such as vanadium and nickel, while simultaneously providing a regenerated catalyst having substantially the same desired metals contents as the fresh catalyst.

EXAMPLE IV

In this example a catalyst which initially comprised 0.6 percent by weight nickel, 1.1 percent by weight cobalt and 8.7 percent by weight molybdenum on an alumina carrier and which had become contaminated by employment in the treatment of a metals containing hydrocarbon stock was subjected to contact with hydrogen peroxide under varying conditions in accordance with our invention. Five different 5 gram samples of this catalyst were contacted with hydrogen peroxide solutions at room temperature for a period of 14 days. The quantity of each solution and its concentration as well as the metals content of the treated samples are shown in Table II below.

TABLE II

| Catalyst treatment, 5 gram catalyst samples | Catalyst metals content, weight percent | | | |
|---|---|---|---|---|
| | Nickel | Cobalt | Molybdenum | Vanadium |
| Aged catalyst | 2.6 | 1.1 | 8.1 | 8.5 |
| Treated with— | | | | |
| 120 ml. of 10% $H_2O_2$ solution | 0.9 | 0.8 | 7.4 | 3.1 |
| 200 ml. of 6% $H_2O_2$ solution | 0.8 | 0.7 | 7.0 | 2.8 |
| 400 ml. of 3% $H_2O_2$ solution | 0.8 | 0.8 | 7.0 | 2.8 |
| 120 ml. of 6% $H_2O_2$ solution | 0.9 | 0.9 | 6.8 | 3.3 |
| 250 ml. of 3% $H_2O_2$ solution | 0.8 | 0.8 | 7.1 | 2.8 |

From the above data it can be seen, particularly when compared with the data from the preceding examples, that treatment of catalysts by the method of our invention for prolonged periods of time has substantially no deleterious effect upon the advantageous results obtained in accordance with our invention.

EXAMPLE V

In this example a nickel-cobalt-molybdenum on alumina catalyst containing 0.6 percent by weight nickel, 1.1 percent by weight cobalt and 8.7 percent by weight molybdenum was employed for the hydrodesulfurization of a 50 percent Kuwait reduced crude boiling above about 650° F. and containing about 4.1 percent by weight sulfur. This desulfurization run was continued for a period of 110 days at temperatures ranging from 725° F. to 825° F., a pressure of 2500 p.s.i.g., a liquid hourly space velocity of 1.1 and a gas feed rate of 5000 s.c.f.

(80 percent $H_2$) per barrel so as to provide a 640° F. +bottoms fraction containing less than about 1 percent sulfur. The aged catalyst from this run was then separated into three samples of about 135 grams each. The first of these samples was subjected to regeneration employing the prior art technique of oxidation burn-off at a temperature of 950° F. The second of these samples was treated in accordance with our invention by immersion in 1260 ml. of an 8 percent aqueous hydrogen peroxide solution for 24 hours followed by immersion in 2140 ml. of water for 4 hours. This catalyst was then contacted with 2130 ml. of 3 percent hydrogen peroxide for 6 hours, 2220 ml. of 1 percent hydrogen peroxide for 18 hours and then subjected to the conventional oxidative burn-off at 950° F. The third sample of the aged catalyst was contacted with a substantially reduced quantity of aqueous solution of hydrogen peroxide than used for the second sample. The result of treating the third sample of catalyst in this manner was to remove substantially less metals from the catalyst than obtained in the treatment of the second sample of catalyst. After the hydrogen peroxide treatment, the third sample was then subjected to an oxidative burn-off at 950° F. Each of these three treated samples of catalyst, together with a sample of fresh nickel-cobalt-molybdenum catalyst, was then evaluated for desulfurization activity charging Kuwait crude containing 2.5 percent by weight sulfur at a temperature of 750° F., a pressure of 2000 p.s.i.g., a liquid hourly space velocity of 2 and a hydrogen feed rate of 10,000 s.c.f. of hydrogen per barrel.

Subsequent to this evaluation run the fresh catalyst, the first sample of treated catalyst (which had been regenerated employing only the conventional burn-off technique) and the second sample of catalyst treated in accordance with our invention were then aged by employing these catalysts in the treatment of a Ceuta crude containing between 120 and 160 p.p.m. vanadium for 17½ days at a temperature of 790° F., a pressure of 2000 p.s.i.g., a space velocity of 2 and a hydrogen feed rate of 10,000 s.c.f. per barrel. Each of these three catalysts was then re-evaluated for desulfurization activity employing the same 2.5 percent by weight sulfur content Kuwait crude and the same operating conditions employed in the first evaluation run except that a temperature of 790° F. was used instead of 750° F. in order to approximate the increase in temperature which would be employed in ordinary commercial operation to maintain desulfurization at a high level while catalyst activity declines. The vanadium content of each of the catalysts after treatment, the percent vanadium removal effected and the desulfurization activity shown in each of the evaluation runs are indicated in Table III below:

effective to remove 80 percent of the vanadium from the aged catalyst. Evaluation of these catalysts for the desulfurization of Kuwait crude at 750° F. clearly indicates that the catalyst subjected to the hydrogen peroxide treatment in accordance with our invention which had a substantial quantity of vanadium removed therefrom was substantially reactivated, approaching the desulfurization activity of a fresh catalyst. As opposed to this, the aged catalyst which had been subjected only to the conventional oxidative burn-off technique provided desulfurization some 22 percent lower than obtained with the fresh catalyst. It is also interesting to note that the aged catalyst which had been treated so as to remove only 29 percent of the vanadium contaminant provided a desulfurization activity quite similar to that obtained from the catalyst which had been subjected only to the oxidative burn-off treatment, thereby indicating that it is necessary to remove a substantial quantity of the contaminant metals in order to provide a reactivated catalyst of significantly enhanced activity.

The second desulfurization evaluation runs, performed after employing the catalysts for 17½ days in the treatment of a high vanadium content stock, demonstrate that the regenerated catalysts initially of unexpectedly enhanced activity provided by the technique of our invention are not merely catalysts having a temporarily enhanced activity which subsequently deactivate rapidly but rather are catalysts subject only to the normal rate of deactivation. This is made particularly clear by comparing the differences in desulfurization activities between the first and second of the two evaluation runs for catalysts given different treatments. Thus, it will be seen that the regenerated catalyst of enhanced activity provided by our invention does not deactivate at an accelerated rate during subsequent use but apparently deactivates at substantially the same, or even a somewhat lower, rate than a fresh catalyst or a catalyst regenerated by the traditional oxidative burn-off technique of the prior art.

EXAMPLE VI

In this example several 5 gram samples of a vanadium contaminated nickel-cobalt-molybdenum on alumina catalyst which had been aged for 110 days in the hydrodesulfurization of the same 50 percent Kuwait reduced crude and under the same conditions as described in Example V were subjected to hydrogen peroxide treatment in accordance with our invention employing both batch type operation and continuous flow type operation. In the batch type operation the catalyst samples were immersed in varying quantities of a 1 percent aqueous

TABLE III

| Catalyst | Vanadium on catalyst after treatment, wt. percent | Vanadium removal, percent | Catalyst activity, percent desulfurization | | |
|---|---|---|---|---|---|
| | | | Initial evaluation test [1] | Evaluation test after treating Ceuta crude for 17½ days [2] | Difference in percent desulfurization between evaluating runs |
| Fresh nickel-cobalt-molybdenum | 0 | | 84.8 | 70.0 | 14.8 |
| Aged catalyst— | | | | | |
| Oxidative burn-off only | 11.5 | 0 | 62.0 | 48.0 | 14.0 |
| $H_2O_2$ treatment followed by oxidative burn-off | 2.2 | 80 | 78.0 | 65.2 | 12.8 |
| $H_2O_2$ treatment with insufficient quantity of $H_2O_2$ resulting in poor removal of contaminating metals followed by oxidative burn-off | 8.2 | 29 | 64.0 | | |

[1] Tested feeding Kuwait crude of 2.5 percent by weight sulfur at 750° F., 2,000 p.s.i.g., 2 liquid hourly space velocity and 10,000 s.c.f. of hydrogen per barrel.
[2] Tested feeding Kuwait crude of 2.5 percent by weight sulfur at 790° F., 2,000 p.s.i.g., 2 liquid hourly space velocity and 10,000 s.c.f. of hydrogen per barrel.

From the data in Table III above it will be noticed first of all that the catalyst aged by employment in the treatment of the reduced Kuwait crude for 110 days had a vanadium content of 11.5 per cent by weight after regeneration by oxidative burn-off and that no vanadium had been removed from the catalyst by such treatment. It will also be noticed that subjecting the aged catalyst to hydrogen peroxide treatment followed by an oxidative burn-off in accordance with our invention was hydrogen peroxide solution for 24 hours at room temperature. In the continuous flow operation the samples of the catalyst were contacted with various quantities of a 1 percent aqueous hydrogen peroxide solution by flowing the peroxide solution over the catalyst during a period of 4 hours at room temperature. The quantity of hydrogen peroxide solution employed together with the percent by weight of vanadium removed for each of the various samples is set forth in Table IV below.

TABLE IV

| Volume of 1% solution, ml. | Vanadium removed, percent by weight |
|---|---|
| *Batch operation* | |
| 75 | 28.4 |
| 125 | 42.7 |
| 175 | 53.9 |
| 275 | 59.1 |
| 550 | 59.0 |
| *Continuous flow operation* | |
| 120 | 53.3 |
| 200 | 63.6 |
| 300 | 78.5 |
| 300 | 76.5 |

A comparison of the data shown in Table IV above demonstrates a preferred technique in the operation of the method of our invention wherein continuous flow operation is employed. It will be noted that whil the batch type operation, wherein the contaminated catalyst was merely immersed in the hydrogen peroxide solution, was quite effective to remove substantial quantities of the vanadium contaminant from the catalyst, the percent vanadium removed for comparable quantities of solution employed was substantially less in the batch operation as distinguished from the continuous flow operation. Thus, for example, when employing 125 ml. of solution in the batch operation 42.7 percent vanadium was removed from the catalyst, while 120 ml. of solution in the continuous flow operation was effective to remove 53.3 percent of the vanadium. It will be also noted that the percent vanadium removed per volume of solution employed in the batch operation tends to level off somewhere about 200 ml. of solution and further increase in the quantity of solution employed does not appear to have any substantial effect on the quantity of vanadium removed from the catalyst. Opposed to this, it will be seen that the quantity of vanadium removed from the catalyst continues to increase with increasing quantities of solution employed throughout the range illustrated when employing a continuous flow operation.

EXAMPLE VII

In this example a portion of the circulating catalyst employed in the fluid catalytic cracking of a metals-containing hydrocarbon is continuously removed from the fluid catalytic cracking system at a point after the main body of the catalyst leaves the reactor and before it enters the regenerator. The portion of the catalyst removed is contacted with an aqueous solution of hydrogen peroxide to remove therefrom contaminant metals, including vanadium and nickel, after which the treated catalyst is returned to the fluid cracking system at a point prior to the introduction of the main body of catalyst into the regenerator. Treatment of the catalyst in this manner in accordance with our invention is effective to increase the activity of the catalyst.

We claim:
1. A process for regenerating a catalyst whose activity has become diminished by employment in the high temperature treatment of a metal containing hydrocarbon at a temperature in the range from about 400° to about 1000° F., which process comprises contacting the catalyst of diminished activity with a hydrogen peroxide solution containing at least about 0.1% by weight hydrogen peroxide in the liquid state in the proportion from about 0.5:1 up to about 50:1 volumes of hydrogen peroxide solution per volume of catalyst for a period of time from about 15 minutes up to about 160 hours to remove at least about 40% of the contaminant metals, said contacting of catalyst and hydrogen peroxide solution being conducted prior to subjecting the catalyst to an oxidative burn-off, separating the contacted catalyst from the hydrogen peroxide, drying the catalyst and subjecting the dried catalyst to an oxidative burn-off.

2. The process of claim 1 wherein the catalyst is washed with an inert medium after separation from the hydrogen peroxide and prior to drying.

3. The process of claim 1 wherein the catalyst is a dual functional catalyst comprised of a metalliferous hydrogenating component composited with a carrier.

4. A process for the high temperature hydrogen treatment of a metal containing hydrocarbon at a temperature in the range from about 400° to about 1000° F., which comprises contacting the hydrocarbon with a dual functional catalyst comprised of a metalliferous hydrogenating component composited with a carrier, continuing such contacting until the catalyst has become substantially deactivated, due at least in part to metals contamination, discontinuing contacting of the catalyst and hydrocarbon, contacting the deactivated catalyst with a hydrogen peroxide solution containing at least about 0.1% by weight hydrogen peroxide in the liquid state in the proportion from about 0.1:1 up to about 50:1 volumes of hydrogen peroxide solution per volume of catalyst for a period of time from about 15 minutes up to about 160 hours to remove at least about 40% of the contaminant metals, said contacting of catalyst and hydrogen peroxide solution being conducted prior to subjecting the catalyst to an oxidative burn-off, separating the catalyst from the hydrogen peroxide, drying the catalyst, subjecting the dried catalyst to an oxidative burn-off thereby substantially reactivating the catalyst, and recontacting the reactivated catalyst with a hydrocarbon.

5. The process of claim 4 wherein the high temperature hydrogen treatment is hydrodesulfurization, the hydrocarbon and the catalyst are also contacted with hydrogen and the contacting of the hydrocarbon, catalyst and hydrogen is conducted under conditions including a pressure from about 500 to about 6000 p.s.i.g., a hydrogen feed rate from about 500 to about 5000 s.c.f. of hydrogen per barrel of feed stock and a liquid hourly space velocity from about 0.1 to about 10.

6. The process of claim 4 wherein the catalyst is washed with an inert medium after separation from the hydrogen peroxide and prior to drying.

7. The process of claim 5 wherein the metalliferous hydrogenating component is selected from the group consisting of Group VI and Group VIII metals, their oxides and sulfides and the carrier consists essentially of a member of the group consisting of refractory metal oxides.

8. The process of claim 5 wherein the catalyst consists essentially of nickel, cobalt and molybdenum components composited with an alumina carrier.

References Cited

UNITED STATES PATENTS

| 1,678,626 | 7/1928 | Jaeger | 252—412 |
| 2,267,736 | 12/1941 | Ipatieff | 252—411 |
| 2,692,240 | 10/1954 | Sprauer | 252—412 |
| 2,772,947 | 12/1956 | Sowerwine | 252—415 |
| 2,880,171 | 3/1959 | Flinn et al. | 252—470X |
| 3,108,972 | 10/1963 | Retailliau | 252—412 |
| 3,147,228 | 9/1964 | Erickson | 252—412 |
| 3,213,012 | 10/1965 | Kline et al. | 208—111X |
| 3,406,011 | 10/1968 | Zirngibl et al. | 252—416X |
| 3,424,696 | 1/1969 | Coingt | 252—412 |

DANIEL E. WYMAN, Primary Examiner

P. E. KONOPKA, Assistant Examiner

U.S. Cl. X.R.

208—217; 252—412, 416

PO-1050
(5/69)

UNITED STATES PATENT OFFICE
CERTIFICATE OF CORRECTION

Patent No. 3,562,150      Dated February 9, 1971

Inventor(s) Harry A. Hamilton, Howard G. McIlvried, Raynor T. Sebulsky

It is certified that error appears in the above-identified patent and that said Letters Patent are hereby corrected as shown below:

Column 3, line 16, delete "solution contacting the catalyst should be at" and insert in lieu thereof the following: --per gram of contaminating nickel. Depending--.

Column 7, line 6, "oxidation" should be --oxidative--.

Signed and sealed this 1st day of June 1971.

(SEAL)
Attest:

EDWARD M. FLETCHER, JR.
Attesting Officer

WILLIAM E. SCHUYLER, J
Commissioner of Patent